3,266,836
MULTI-PURPOSE TRAILERS

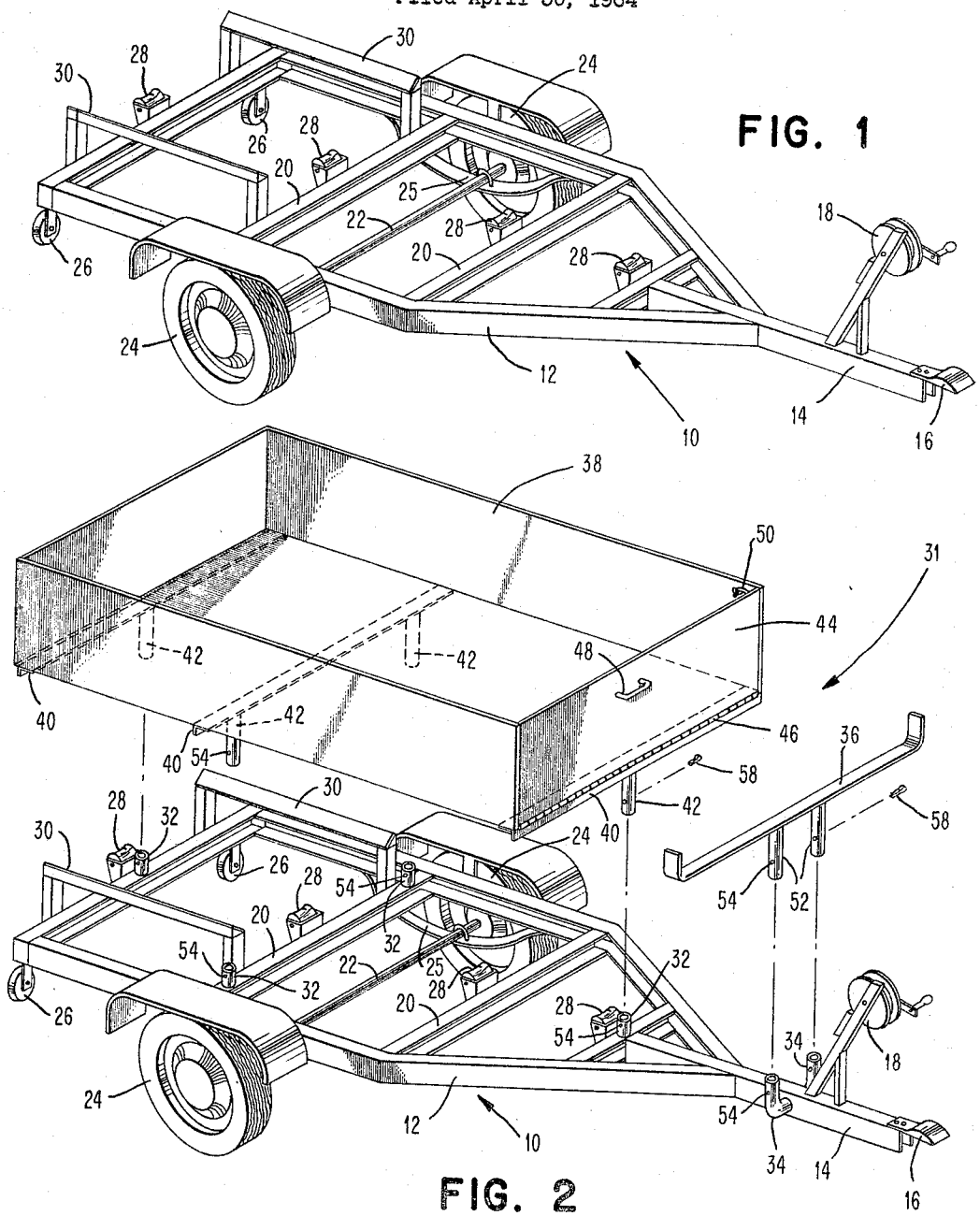

Chester F. Taylor, Warren County, N.J. (617 Central Ave., Alpha, N.J.), and Vito Rappa, Northampton County, Pa. (128 Phillips Ave., Easton, Pa.)
Filed Apr. 30, 1964, Ser. No. 363,854
6 Claims. (Cl. 296—10)

This invention relates to multi-purpose trailers, and in particular to combination boat/utility purpose trailers and to means for converting existing boat trailers into combination boat/utility purpose trailers.

A boat trailer is purchased for the primary purpose of transporting a boat from one place to another. The boat trailer is usually coupled to an automobile via a hitch and is used for transporting the boat from an inland home to a boating area at the beginning of a boating season and return at the end of the boating season. During the part of the season that the boat is in the water, the typical boat trailer is left idle due to its inherent single purpose function.

A good boat trailer is strong, is adapted to carry heavy loads, is supplied with individual brakes, and contains tail lights and directional signals. A trailer is often required to be licensed for safety reasons by state law. In view of the initial expense required for obtaining a good boat, it is highly desirable that the boat trailer be adapted to carry utility loads at certain times and the boat at other times, the adaptation to be relatively inexpensive.

Many persons in the pior art have suggested various types of combination trailers. One of the combination trailers of the prior art utilizes a conventional box type trailer whose sides fold inwardly to achieve a boat carrier effect, the outer sides of the box carrying a cross-piece or cradle for supporting a boat. Another combination trailer of the prior art utilizes removable cross-pieces or cradles so that a boxlike body can be attached to the framework of the trailer. Generally, the combination trailer of the prior art required a special boat trailer for conversion to utility purposes. A boat trailer in the past could also be converted into a utility trailer through tedious manipulation removing the cradle from the frame of the trailer.

It is an object of this invention to provide a novel combination boat/utility purpose trailer.

Another object of this invention is to provide means for converting present boat trailers to combination boat/utility purpose trailers.

Yet another object of this invention is to provide novel means for adapting existing and future boat trailers with connection means suitable for subsequent engagement with a utility carrier.

Still another object of this invention is to provide novel means for converting most sizes of boat trailers to combination boat/utility purpose trailers utilizing various sizes of utility carriers.

A still further object of this invention is to provide novel means for easily and rapidly converting a combination boat/utility purpose trailer from one state to another.

In accordance with one embodiment of this invention, attachments are provided for connection with the frame of a boat trailer. The attachments can be connected in a permanent manner preferably by welding, or can be temporarily affixed by other means, as desired. Preferably, welding is preferred because when the trailer is used for transporting a boat, the attachments do not interfere therewith. The attachments include upwardly extending short sections of hollow pipe connected to the frame of the trailer at the cross-bar, drawbar, and elsewhere. A utility body having a foldable front side has a plurality of relatively long sections of pipe affixed to the underside of the body, as by welding, the pipe sections of the utility body being adapted to mate with the relatively short sections of pipe. The long and short sections of the pipe are of different diameters thereby permitting the section to mate. Apertures through both sections of pipe permit the sections to be temporarily joined with cotter pins. A bracket is coupled to the drawbar through the use of tubular members held together by a cotter pin in a similar manner, whereby elongated loads, such as ladders, can be carried in the utility body and secured to the drawbar bracket.

Other objects and advantages of this invention, together with its construction and mode of operation, will become more apparent from the following description when read in conjunction with the accompanying drawing and in which:

FIG. 1 is a perspective view of a boat trailer well known in the prior art; and

FIG. 2 is an exploded perspective view of a multi-purpose trailer in accordance with one embodiment of this invention.

Referring to FIG. 1, there is shown a conventional boat trailer 10 which includes a frame 12 having a drawbar 14. The drawbar 14 has a coupler or hitch 16 at one end thereof for connection with a vehicle for towing purposes. A winch 18 is provided along the drawbar 14 for providing a towing cable for raising a boat onto the trailer 10, securing the boat to the trailer 10, and for lowering the boat from the trailer 10. For optimum balance, the drawbar 14 is usually coupled along an axis central to the boat trailer 10. The boat trailer 10 is provided with one or more cross-bars 20 which are generally perpendicular to the drawbar 14 axis. One other cross-bar 20 is usually located immediately above an axle 22. The axle 22 supports a wheel and tire 24 at each end thereof, the axle 22 being supported with respect to the frame 12 by means of suitable springs 25. The boat trailer is further provided with a license plate (not shown) and suitable tail-lights 26 and directional signals provided therefor.

The typical boat trailer 10 is characterized by one or more keel rollers 28 which are used for supporting the keel of a boat. The support provided by the keel roller 28 is provided during raising and lowering a boat onto the trailer only (for some trailers), during transport (for other trailers), and at all occasions (for other trailers). It is immaterial for the purposes of this invention as to the period of support provided by the keel rollers.

The boat trailer 10 of the prior art further includes oppositely disposed upwardly extending cradles 30 affixed to the frame 12 for supporting the sides of the bottom of a boat. The cradles 30 may be of the roller types, as desired, or may be of the padded bunker type as illustrated in the drawings. It is emphasized that the inventive teachings of this invention are applicable to both types of cradles, and that the term "cradles" used in the specification and claims is meant to include both types.

The boat trailer 10 of the prior art, having oppositely disposed upwardly extending cradles 30, is a single purpose trailer, unsuitable for other purposes.

Referring to FIG. 2, there is shown, in an exploded perspective view, a combination boat/utility purpose trailer utilizing a boat trailer 10 of the prior art.

Several ways are desirable for practicing this invention. First, a boat trailer 10 (well known in the art) may be obtained from an available source (or may otherwise be available) and the teachings set forth hereinafter be performed for converting the boat trailer 10 into a combination boat trailer/utility purpose trailer 31. Second, a manufacture of boat trailers 10 can manufacture combination trailers 31 by following the teachings of this invention. Third, the hardware required for converting the single purpose trailer 10 into a combination trailer 31 can be separately marketed.

The combination trailer 31 shown in FIG. 2 includes the boat trailer 10 which is provided with a frame 12, a drawbar 14, a hitch 16, a winch 18, one or more cross bars 20, an axle 22, wheel and tires 24, suitable springs 25, tail-lights 26, one or more keel rollers 28, and oppositely disposed upwardly extending cradles 30.

A plurality (at least three, and preferably four for proper support) of connecting members 32 which may be upwardly extending tubular members (such as hollow pipes of a given inner diameter) are initially secured to the frame 12 of the boat trailer 10, as by welding. The member 32, although upwardly extending, are relatively short in length so as to not interfere with a boat when it is carried by the trailer 31. The two members 32, affixed to opposite ends of the cross-bar 20 above the axle 22, being adjacent to the upwardly extending cradles 30, are less than the height of the cradles 30 in length, thereby insuring that no interference is created by the members 32. The other two members 32 are secured to the trailer 32 along its central axis, adjacent the keel rollers 28. The height of the members 32 is less than the height of the keel rollers 28, thereby affording no interference with a boat when the trailer is used for carrying a boat. A receiving member, including a pair of tubular hollow pipes 34, is affixed to the drawbar 14, and is upwardly extending for subsequent engagement with a bracket 36. The pipes 34, if secured to the drawbar 14 in a horizontal direction (as by welding or other suitable means) as shown, can be L-shaped so as to extend in an upward direction. The boat trailer 10, modified by the connecting members 32 and 34, can be used as a boat trailer for transporting a boat without the member 32 and 34 interfering therewith. With the connecting members 32 and 34 already affixed to the trailer, the trailer can easily be adapted, at another time, as a utility trailer by adding (temporarily) a utility body and bracket, as set forth in greater detail hereinafter.

A utility body 38 is constructed of suitable material, such as wood, iron, or aluminum. The body 38 is generally rectangular in shape in order to serve a general purpose function. The underside of the utility body 38 has a plurality of angle irons 40 secured thereto in order to provide strength and support. A plurality of downwardly extending connecting means 42 is secured in a suitable manner (e.g., welding) to the body 38 at the angle irons 40. The connecting means 42 is adapted to engage with the upwardly extending members 32 of the trailer. The connecting means 42 are relatively long in length and, preferably, has an outer diameter that is slightly less than the fixed inner diameter of the upward members 32. Thus, in the preferred embodiment, the downward means 42 mate within the upward members 32. As thus described, the utility body 38 can be easily engaged with the boat trailer 10, without interfering with the cradles 32, thereby providing a utility purpose trailer; the body 38 is removable, whereby the trailer can be used for transporting a boat.

The utility body 38 can be provided with one or more sides 44 which is adapted to be pivoted about a hinge 46. The pivotable side 44 is provided with a convenient handle 48 and a suitable latch 50. Thus, elongated loads, such as ladders, can be carried by the utility body 38, with the side 44 pivoted downward, and secured to the bracket 36.

The bracket 36 is generally U-shaped, with a width approximating the width of the utility body 38. The base of the bracket 36 has affixed thereto (as by welding) downwardly extending engaging means, such as a pair of tubular members 52, which are adapted to engage with the receiving members 34 of the drawbar 14. Preferably, the engaging means 52 mate within the members 34.

Each of the upwardly extending tubular members 32, downwardly extending members 42, upward receiving members 34, and downwardly extending engaging means 52 has an aperture 54 provided therethrough, so that, when the utility body 38 and bracket 52 are engaged with the boat trailer to form a utility trailer, the apertures of the mated members are aligned therethrough.

A cotter pin 58 (or other suitable temporary joining member) is provided to be inserted through the apertures 54 of each mated members 32, 42, and 34, 52, thus joining the utility body and bracket to the frame of the trailer 31. The cotter pins 58 can be easily removed, permitting easy removal of the body 38 and bracket 36.

There has been described a novel combination boat trailer and utility purpose trailer, which can be converted from one mode of operation to another with ease.

Various modifications will suggest themselves to those skilled in the art, such as additional connection members for ultra-heavy loads, and the use of other temporary fittings in lieu of tubular members. It is, therefore, desired that this invention be construed broadly, and that the invention be limited solely by the scope of the claims.

What is claimed is:

1. In combination, a boat trailer including a frame and a pair of oppositely disposed cradles extending upward a fixed distance and affixed to said frame for supporting the sides of the bottom of a boat, said frame including a plurality of vertically oriented receiving means, a utility body having an integral base, and a plurality of vertically oriented members affixed to the underside of said base, said members adapted to engage with said receiving means, and when so engaged, extending a distance exceeding said fixed distance, whereby said trailer is adapted to carry a boat when said members are not engaged with said receiving means, and whereby said trailer is adapted for utility purposes when said members are engaged with said receiving means.

2. In combination, a boat trailer including a frame and a pair of oppositely disposed upwardly extending cradles extending upward a fixed distance and affixed to said frame for supporting the sides of the bottom of a boat, a plurality of upwardly extending sections of hollow pipe affixed to said frame, a utility body having an integral base, and a plurality of downwardly extending sections of hollow pipe affixed to said body, one of said plurality of pipes being adapted to be received within the hollow portions of said other plurality of pipes, and, when so engaged, extending a distance exceeding said fixed distance, whereby said trailer is adapted to carry a boat when said downwardly extending pipes are not mated with said upwardly extending pipes, and whereby said trailer is adapted for utility purposes when said downwardly extending pipes are mated with said upwardly extending pipes.

3. In combination, a boat trailer including a frame and a pair of oppositely disposed upwardly extending cradles extending upward a fixed distance and affixed to said frame for supporting the sides of the bottom of a boat, a plurality of upwardly extending sections of hollow pipe of a fixed inner diameter affixed to said frame and having an aperture provided in each of said pipes, a utility body, a plurality of downwardly extending sections of pipe having an outer diameter less than said fixed diameter and affixed to said utility body and having an aperture provided in each of said last named sections of pipe, wherein the apertures of the mated sections are aligned when said downwardly extending sections of pipe mate with said upwardly extending sections of pipe, said pipes, when mated, extending a distance exceeding said fixed distance, and a plurality of cotter pins, each of said cotter pins being adapted to be inserted transversely through the aligned aperture of a respective mated section, said cotter pins after insertion being adapted to be spread thereby securing said pipes to one another, whereby said trailer is adapted to carry a boat when upwardly and downwardly extending sections of pipe are not mated to each other, and whereby said trailer is adapted for utility purposes when said downwardly extending sections of pipe are engaged with said upwardly extending sections of pipe.

4. In combination, a boat trailer, including a frame and a pair of oppositely disposed upwardly extending cradles affixed to said frame for supporting the sides of the bottom of a boat, a plurality of upwardly extending sections of hollow pipe of a fixed inner diameter affixed to said frame and having an aperture provided in each of said pipes, a utility body, a plurality of downwardly extending sections of pipe having an outer diameter less than said fixed diameter and affixed to said utility body and having an aperture provided in each of said last named sections of pipe, wherein the apertures of the mated sections are aligned when said downwardly extending sections of pipe mate with said upwardly extending sections of pipe, and a plurality of cotter pins, each of said cotter pins being adapted to be inserted transversely through the aligned aperture of a respective mated section, said cotter pins after insertion being adapted to be spread thereby securing said pipes to one another, whereby said trailer is adapted to carry a boat when upwardly and downwardly extending sections of pipe are not mated to each other, and whereby said trailer is adapted for utility purposes when said downwardly extending sections of pipe are engaged with said upwardly extending sections of pipe, and wherein one of the sides of said utility body is supported on a hinge and is adapted to be pivotably lowered, said frame including a receiving member located on said frame aligned with said pivotable side, and a bracket adapted to engage with said receiving member, whereby an elongated load is adapted to be carried by said utility body and secured to said bracket.

5. In combination, a boat trailer including a frame and a pair of oppositely disposed upwardly extending cradles extending upward a fixed distance and affixed to said frame for supporting the sides of the bottom of a boat and further including a multiple number of keel rollers for supporting the keel of a boat, a plurality of upwardly extending female connecting means affixed to said frame, a utility body having an integral base, a like plurality of downwardly extending male connecting means affixed to said base, whereby said trailer is adapted to carry a boat when said male and female connecting means are not engaged, and whereby said trailer is adapted to transport a utility body when said male connecting means are engaged with said female connecting means, and means for manually locking and unlocking said male and female connecting means together, said connecting means, when engaged, extending a distance exceeding said fixed distance.

6. The combination as claimed in claim 5 wherein said connecting means are tubular members and wherein said locking means include cotter pins.

References Cited by the Examiner
UNITED STATES PATENTS

| 1,580,831 | 4/1926 | Lewis. | |
| 2,743,027 | 4/1956 | Robertson | 296—35 X |
| 3,098,674 | 7/1963 | White | 296—23 |
| 3,116,949 | 1/1964 | Muse | 296—23 |

FOREIGN PATENTS 349,539   11/1960   Switzerland.

BENJAMIN HERSH, *Primary Examiner.*

P. GOODMAN, *Assistant Examiner.*